United States Patent
Bates et al.

(10) Patent No.: US 7,047,548 B2
(45) Date of Patent: May 16, 2006

(54) RECALL OF PREVIOUS PROGRAM CHANNEL

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 09/836,313

(22) Filed: Apr. 17, 2001

(65) Prior Publication Data

US 2002/0152459 A1 Oct. 17, 2002

(51) Int. Cl.
 *G06F 3/00* (2006.01)
 *G06F 13/00* (2006.01)
 *H04N 5/445* (2006.01)
 *H04N 9/00* (2006.01)
 *H04H 7/16* (2006.01)

(52) U.S. Cl. .............................. 725/38; 725/14; 725/46
(58) Field of Classification Search .................. 725/37, 725/38, 46, 52, 56, 57, 58, 61, 89, 9, 14, 725/29, 34; 348/14.05
See application file for complete search history.

(56) References Cited

U.S. PATENT DOCUMENTS

| 4,060,839 | A | * | 11/1977 | Meadows | 360/133 |
| 5,323,240 | A | * | 6/1994 | Amano et al. | 348/731 |
| 5,564,088 | A | * | 10/1996 | Saitoh | 455/186.1 |
| 5,801,747 | A | * | 9/1998 | Bedard | 725/46 |
| 6,614,987 | B1 | * | 9/2003 | Ismail et al. | 386/83 |

* cited by examiner

*Primary Examiner*—Chris Kelley
*Assistant Examiner*—Jamieson Fish
(74) *Attorney, Agent, or Firm*—James R. Nock (57) ABSTRACT

An apparatus, program product and method for recalling a previous program channel of interest from a current program channel, where the channel of interest is determined by the amount of time a user has previously spent on the channel. The amount of elapsed time a user spends on a program channel is monitored. If the elapsed time exceeds a predetermined threshold, the program channel is identified as a channel of interest. As the user switches from the channel of interest to subsequent broadcast channels (i.e., "surfs"), the channel of interest is retained in memory as long as the amount of time spent on any subsequent channel is less than the predetermined time threshold. If the amount of time spent on a subsequent channel is greater than the predetermined time threshold, the subsequent channel is identified and stored as the new channel of interest. At any time, the user may select a selective view function to return to the channel of interest from the currently selected channel.

2 Claims, 8 Drawing Sheets

RECALL OF PREVIOUS PROGRAM CHANNEL

FIELD OF THE INVENTION

This invention is generally related to selecting a channel of program information, and in particular, to switching from a current program channel to a previously accessed program channel.

BACKGROUND OF THE INVENTION

As the number of available sources of broadcast programming increases, it becomes more and more difficult for broadcast viewers to locate interesting program material. For example, in the early days of television, a television viewer was limited to watching television programs on only a few television channels, such as those of the local affiliates of national broadcast networks such as ABC, CBS and NBC. With such a limited number of programming sources, viewers were able to simply "surf" between channels to locate interesting programs.

Due to the advent of cable and satellite television services, however, the number of channels available to television viewers has risen dramatically, to the point where some viewers may have access to as many as several hundred channels. With so many available channels, controls that allow the viewer to switch between channels have also improved from the early days when television channels where selected by rotating a clicking dial on the television set. Today, channels are typically selected from the comfort of a reclining chair using a remote control supplied with the television or set top box. Early remotes simply allowed the user to adjust the volume and switch to the next channel in either the "up" or "down" direction, but as the number of channels grew, a need to allow for direct channel access was observed and numeric buttons where added. Today there are numerous controls to help the user switch between channels. Examples of these include buttons that allow the user to switch between and establish user defined channel lists, buttons to bring up and navigate an online TV guide, and a button that allows the viewer to quickly switch back and forth between two channels.

When a viewer's show of interest is interrupted by a commercial, despite this generous collection of navigational aids, and because channels with a similar format are often grouped together either by the provider or by a user defined channel list, he or she will typically use the more primitive channel up and down buttons to "surf" other channels while the commercial is in progress. A problem occurs when a viewer wishes to return to his or her show of interest. To do this the viewer has to either press the opposing up or down button the same number of times or enter the number for the channel of the show of interest. Many users often forget about the other channels they have surfed though and press the button on the remote that allows the user to switch between the current and the last channel viewed hoping to be taken directly to the show of interest. These viewers are often annoyed when they are not taken back to the channel of the show of interest, but to the last channel they surfed through. Now they must either repeatedly press the channel up or down buttons or remember and enter the channel number to return to the show of interest. These users are still further annoyed when they find the commercial or uninteresting segment of the show of interest is still being broadcast and wish to return to their surfing only to find that to return to the place they left off, they must either repeatedly press the channel up or down button or remember and enter the channel number of the point where they quit surfing. Therefore, a significant need exists in the art for a channel control that will allow the viewer to swap between the current surfing position and the show of interest so that the "territory" covered during a channel surf can be extended.

SUMMARY OF THE INVENTION

The invention addresses these and other problems associated with the prior art by providing an apparatus, program product and method in which the user can switch repeatedly between the current channel and the channel broadcasting the show of interest. Among other possible implementations, such a configuration permits a previous channel of interest to be recalled relative to another channel, which may have been more recently selected.

Recall of previous channel based on view time may be implemented, for example, by monitoring the viewing time for a first television channel, switching to a second television channel and determining if view time exceeded a threshold, then storing first television channel as the channel of interest. After the viewer switches though a plurality of additional television channels to some final channel, remaining on none longer then the threshold period, the viewer activates the selective view function which returns him to the last channel of interest, and then saves the final channel as the last channel of interest, so that by pressing the selective view button again the viewer can return to the final channel and continue to "surf".

Recall of previous channel based on view time may also utilize additional information to reset the channel of interest. As one example, utilizing an online program guide or clock to determine when a show on the channel of interest has ended results in the channel of interest being reset. Utilizing viewer history, the channel of interest is then initialized with a television channel that has historically been of interest during the current time slot.

Recall of previous channel based on view time may also utilize additional information to adjust the threshold time for a particular television channel. As one example, utilizing an online program guide and viewer history, the threshold time is lengthened for television channels and shows that are seldom viewed, and shortened for shows and television channels that are frequently viewed, thus making it harder for seldom viewed shows or television channels to become the channel of interest while making it easier for the frequently viewed channels to become the channel of interest.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION

Figure 1:
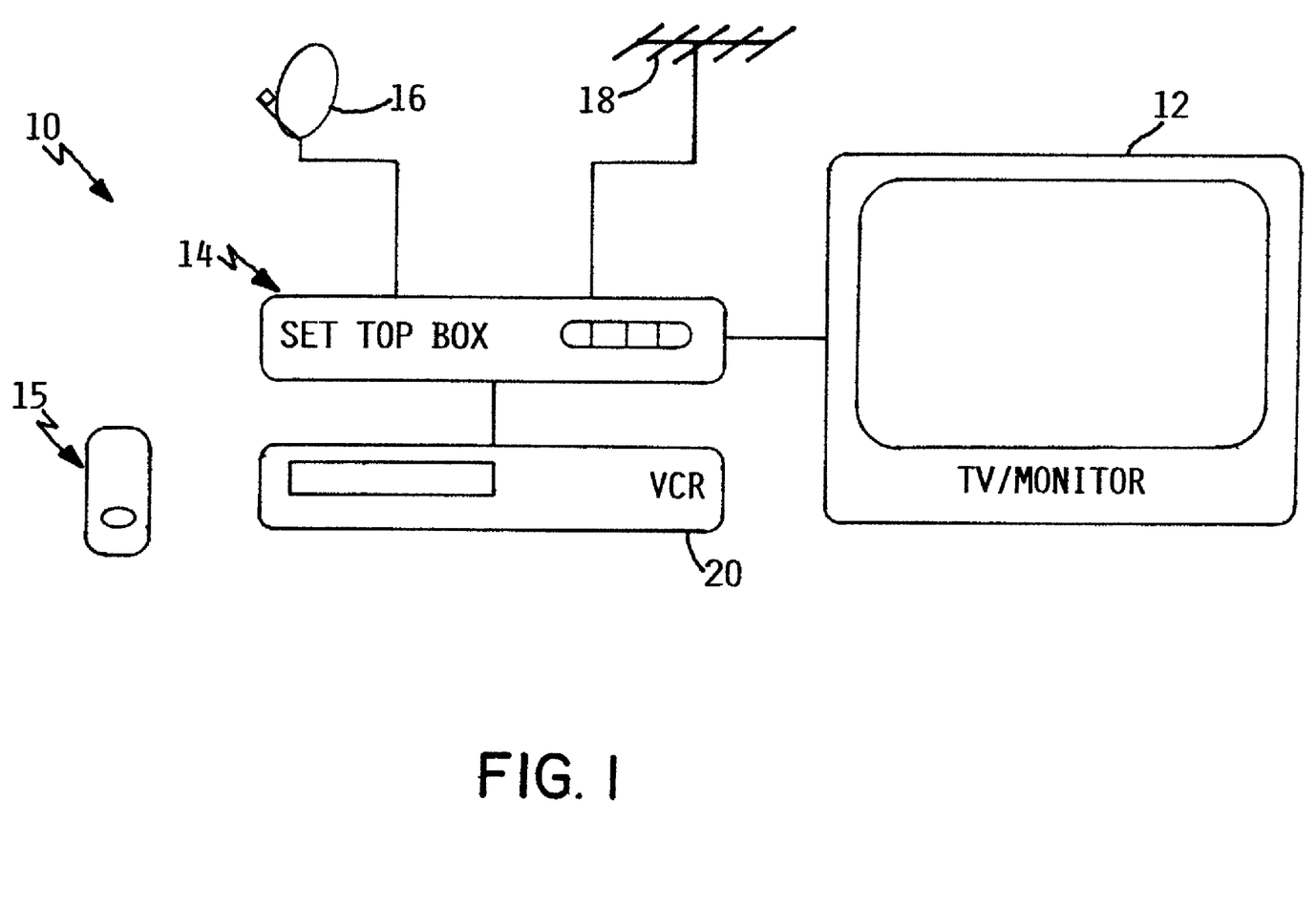
FIG. 1 is a block diagram of a television system incorporating recall of the previous channel based on view time consistent with the invention.

Turning to the Drawings, wherein like numbers denote like parts throughout the several views, FIG. 1 illustrates a television system 10 incorporating recall of previous channel based on view time consistent with the invention. System 10 includes a television or monitor 12 coupled to a set top box 14 to receive audio and video signals therefrom. System 10 also includes a remote control 15 capable of controlling set top box 14 as well as other audio and video devices including television or monitor 12. Set top box 14 in the illustrated implementation is a satellite receiver capable of receiving satellite television broadcast signals via a direct broadcast satellite (DBS) dish 16, as well as off-air television broadcast signals via an antenna 18 (or alternately, a cable provider).

Also illustrated in system 10 is a video cassette recorder (VCR) 20, coupled to receive input from set top box 14, as well as from any additional sources, e.g., off air or cable television broadcast signals (not shown separately). VCR 20 may also be capable of optionally outputting audio and video signals directly to television/monitor 12, rather than passing such signals through set top box 14.

Recall of a previous channel based on the amount of view time spent on the previous channel is implemented in the illustrated implementation within set top box 14. However, it will be appreciated by those of ordinary skill in the art having benefit of the instant disclosure that such functionality may be implemented in any number of devices capable of providing program information to a user on one of a plurality of channels, including, for example, televisions, cable set top boxes, personal video recorders, computers, VCR's, audio tuners, etc. Further, set top box 14 need not necessarily be capable of directly receiving and/or displaying television programs to viewers, so long as the box is capable of monitoring a user's viewing habits and allows the selection between a plurality of programming choices. In addition, television programs may be received from any number of sources, including off-air broadcast sources, cable television sources, satellite television sources, and computer network sources such as the Internet.

Figure 2:
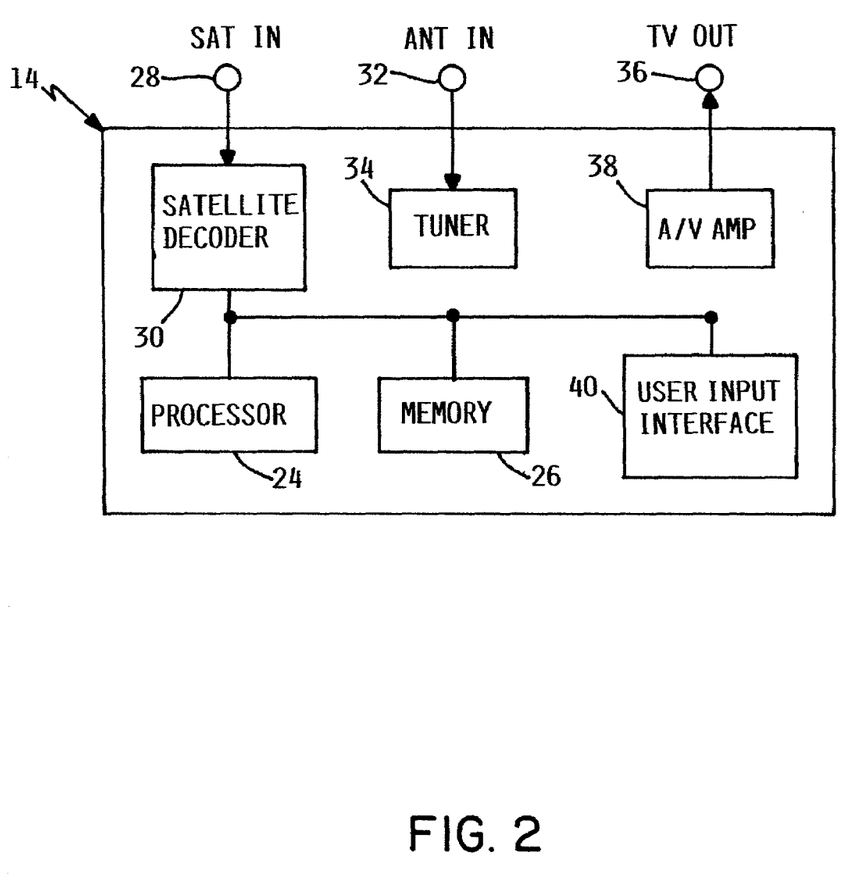
FIG. 2 is a block diagram of the set top box from the system of FIG. 1.

Now turning to FIG. 2, set top box 14 is illustrated in greater detail. Set top box 14 is under control of a processor 24, which is interfaced with a memory 26 storing both program code suitable for execution by the processor, as well as additional data structures required by the processor in controlling the operation of the set top box. Processor 24 may represent one or more processors (e.g., microprocessors or microcontrollers), and memory 26 may represent the random access memory (RAM) devices comprising the main storage of the set top box, as well as any supplemental levels of memory, e.g., cache memories, non-volatile or backup memories (e.g., programmable or flash memories), read-only memories, etc. In addition, memory 26 may be considered to include memory storage physically located elsewhere in set top box 14, e.g., any cache memory in processor 24, as well as any storage capacity used as a virtual memory, e.g., as stored on a mass storage device or on another data processing system coupled to set top box 14 via an external network (not shown).

Satellite television broadcast signals are received by set top box 14 through a satellite input 28 and decoded by a satellite signal decoder 30. Likewise, off-air or cable television signals are received through an antenna input 32 and processed by a tuner 34. Audio and/or video data output by either of decoder 30 and tuner 34 are output to a television or video monitor through a TV output 36 driven by audio/video amplification circuitry 38. Furthermore, user input is received from a viewer via interface 40, e.g., to receive input via front panel buttons and/or a remote control.

Set top box 14 operates under the control of an embedded operating system, and executes or otherwise relies upon various software and/or firmware applications, components, programs, objects, modules, data structures, etc. In general, the routines executed to implement the embodiments of the invention, whether implemented as part of an operating system or a specific application, component, program, object, module or sequence of instructions, will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and other programmable electronic devices, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

Figure 3:
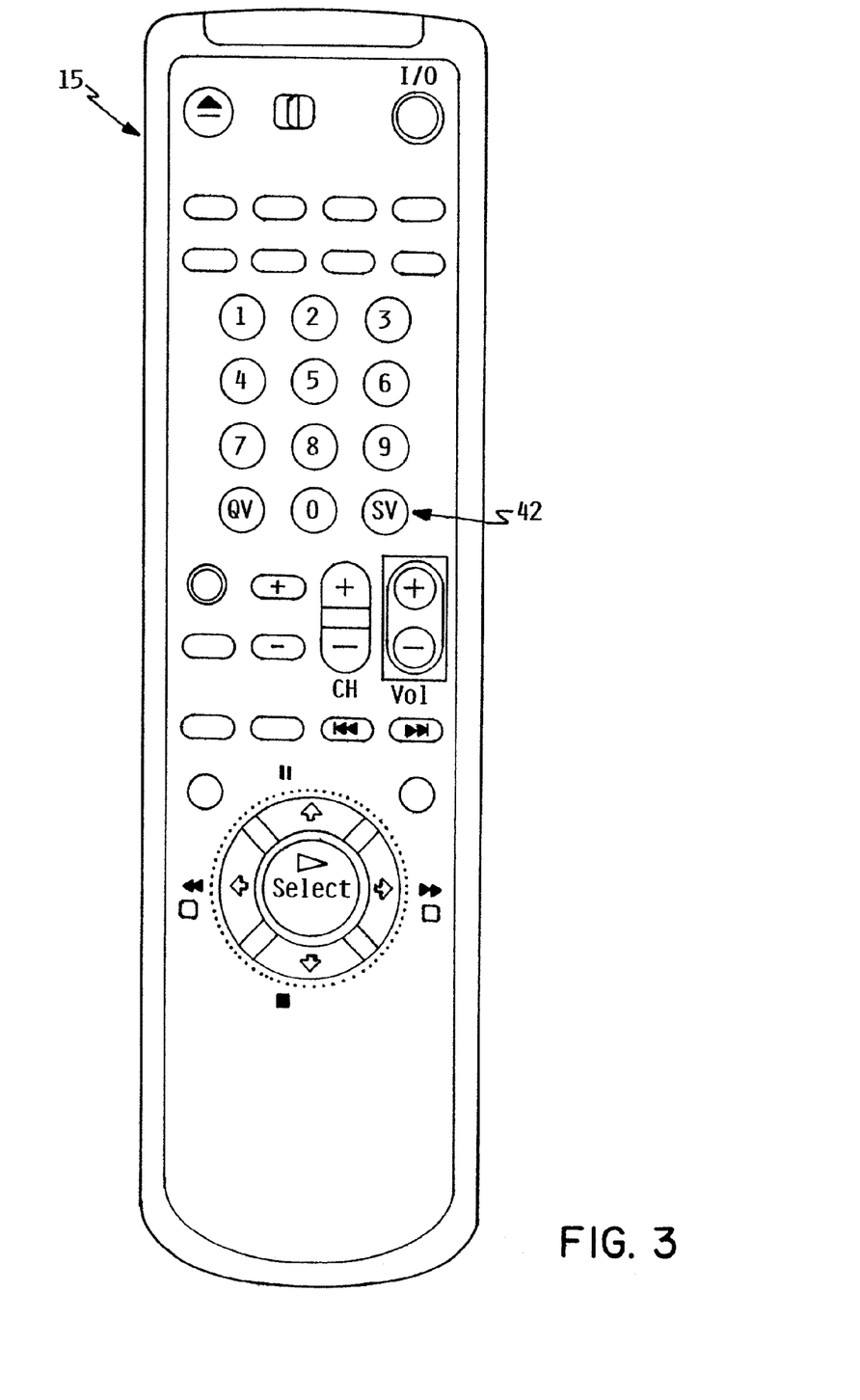
FIG. 3 is a block diagram of a remote control used to control the set top box of FIG. 2, and containing a "Selective View" (SV) button.

FIG. 3 presents a more detailed view of remote control 15. Remote control 15 can utilize several different transmission mediums to communicate which button is being pressed to set top box 14. Examples of these transmission mediums include but are not limited to, Infrared (IR) and Ultra High Frequency (UHF). Pressing a button on remote control 15 sends a unique signal to a receiver, which is part of the user input interface 40 of set top box 14. Remote control 15 is commonly the primary interface to set top box 14. Recall of previous channel based on view time is accessed by pressing another button 42, which is labeled, by way of example, SV (Selective View).

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIGS. 1 and 2 is not intended to limit the present invention. Indeed, those skilled in the art will recognize that other alternative hardware and/or software environments, including implementations partly or wholly in hardwired logic, may be used without departing from the scope of the invention.

Figure 4:
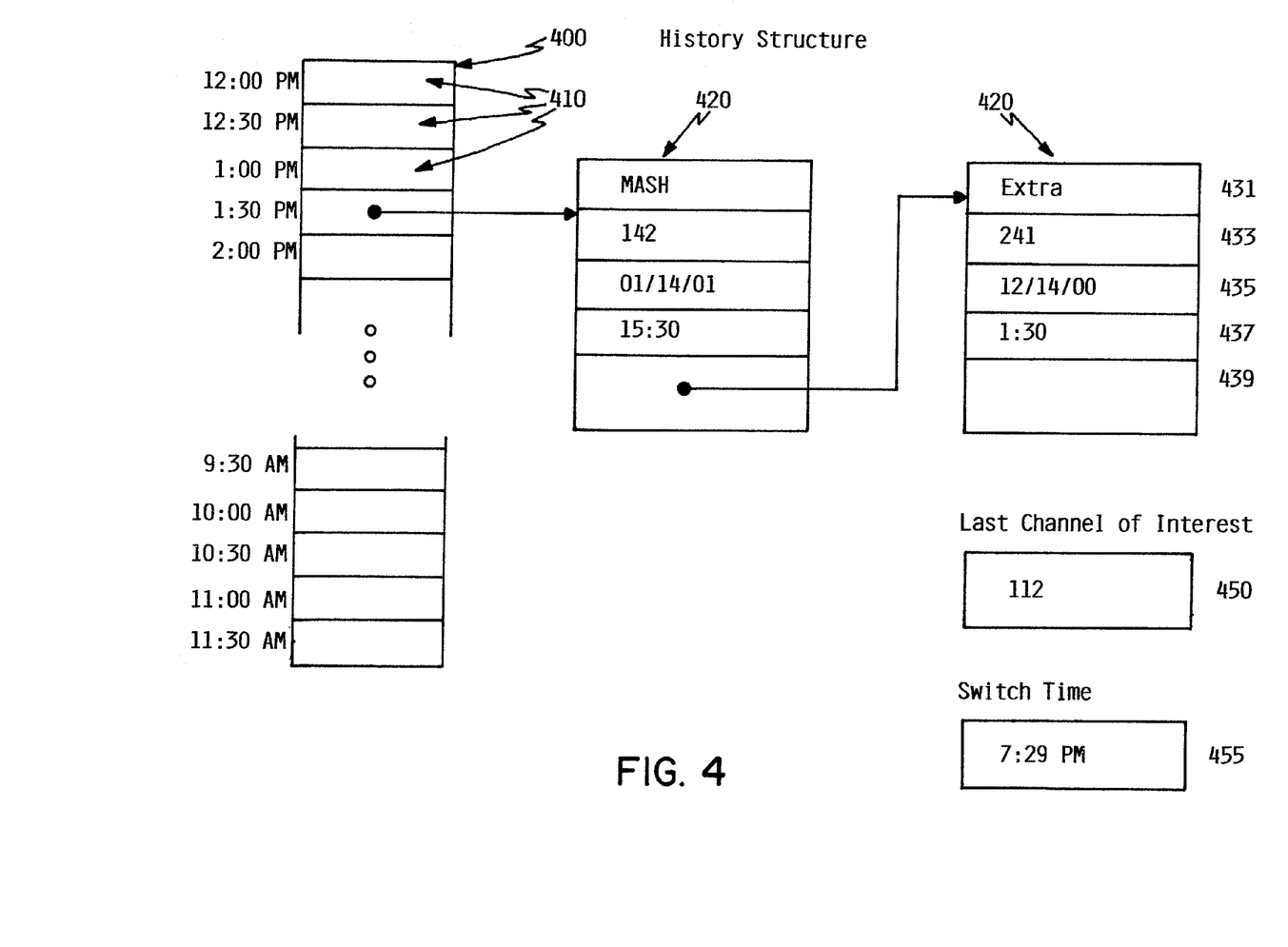
FIG. 4 is a block diagram of data structures utilized by the set top box of FIG. 2.

Recall of previous channel based on view time in the illustrated embodiment relies on a number of data structures, e.g., a history structure 400 illustrated in FIG. 4. Table 400 resides in memory 26 and includes a plurality of entries or records 410, each corresponding to a particular 30-minute time slot. Each of the entries 410 may point to a linked list of television show entries 420. These entries are for television shows that are typically viewed during the corresponding time slot. Each entry 420 contains multiple fields of information, which are of interest to the present invention. Field 431 contains the title of the television program for which the record pertains. Field 433 contains the channel on which the television show was viewed. Field 435 contains the date when the television program was last viewed. Field 437 is the total cumulative time the viewer has spent watching this television show during this time slot. Finally, field 439 is a pointer to the next link in the list of records 420 that contain viewing information for television shows viewed during a particular time slot. Other information relied on by the invention that is stored in memory 26 include the Last Channel of Interest 450 which is used to store the channel that is most likely to be of interest to the user when the selective view button is pressed, and switch time 455 which contains time at which the user came to view the current channel.

It will be appreciated that alternate data structures may be utilized to store the information in table 400. Although table 400 is shown as one table keyed by times slots, those skilled in the are will appreciate that a table 400 could be allocated to each day of the week so that viewing habits could be tracked not only by time slot, but by the time slot on a given day, and still be in the scope of this invention. Likewise one table 400 could be allocated for and used on weekends while another table 400 could be allocated for and used during weekdays. Moreover, alternate manners of identifying unique television shows, e.g., program identifiers, may be used in the alternative to identify the television show in record 420.

Figure 5A:
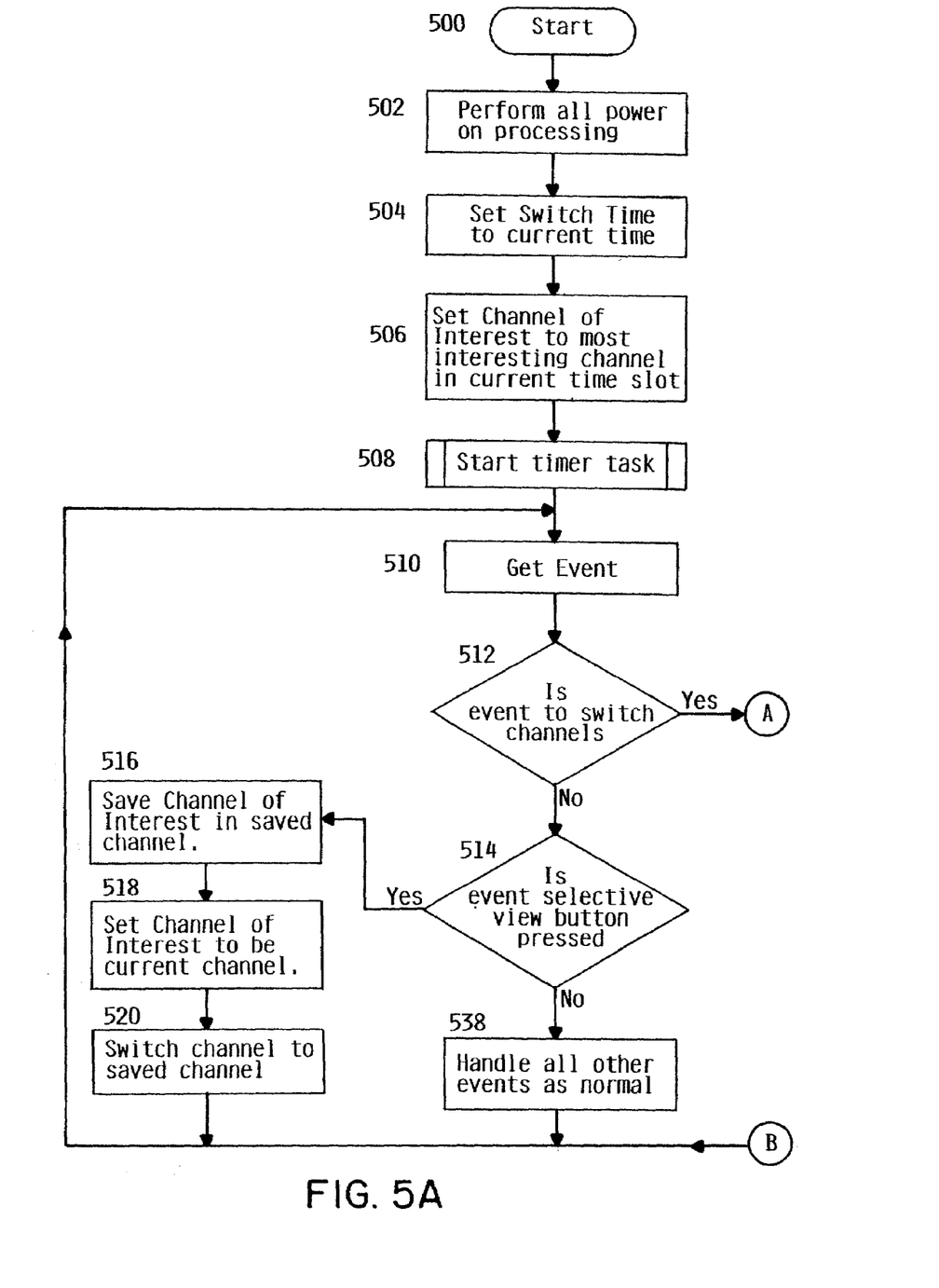
FIGS. 5A and 5B collectively illustrate the program flow of the main routine executed by the set top box of FIG. 2 which processes commands from the remote and front panel controls.
Figure 5B:
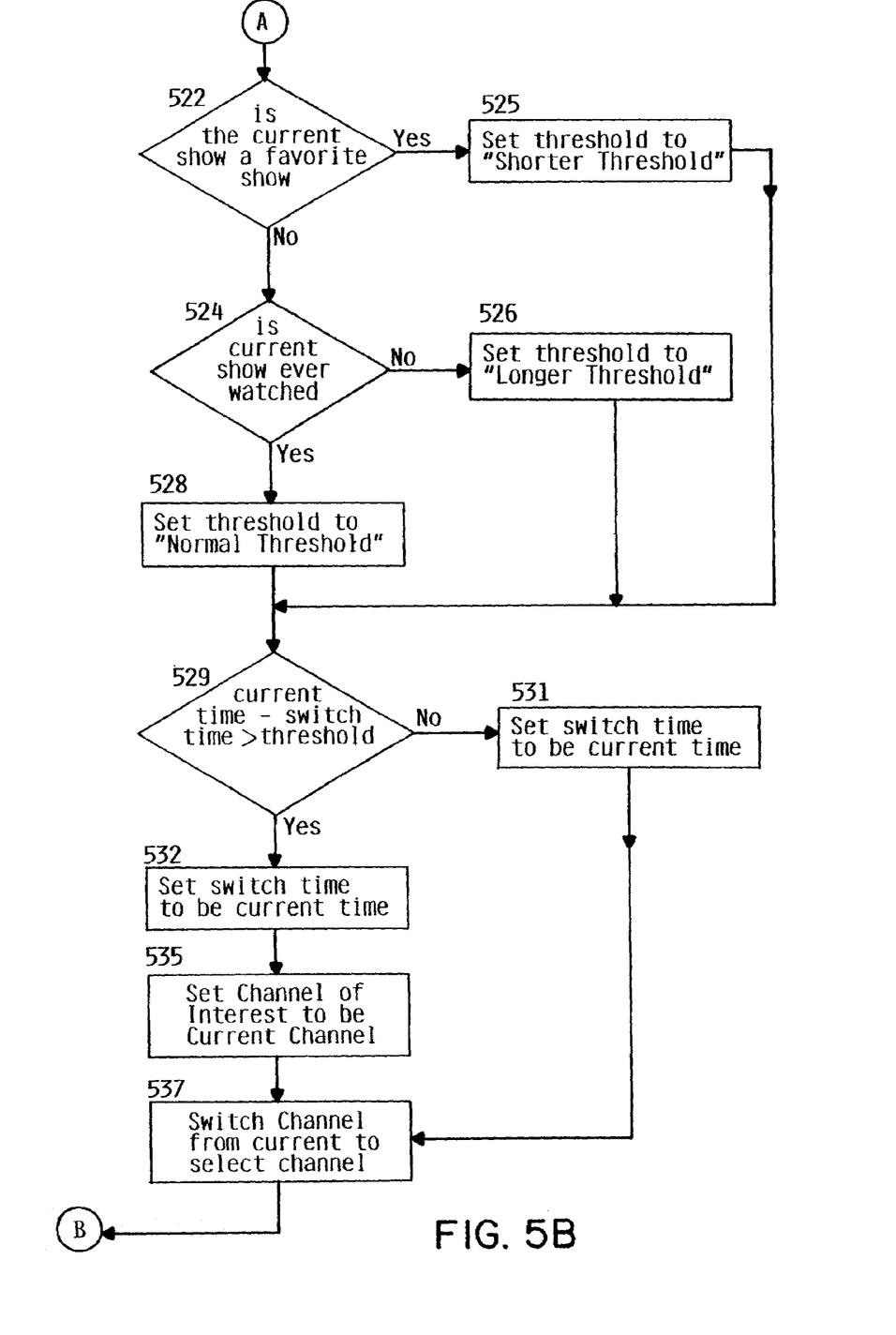

FIGS. 5a and 5b collectively illustrate the sequence of operations that occur in a main routine 500 initiated in response to the powering on of set top box 14. Routine 500 begins in block 502 by performing routine power on of set top box 14. Next, block 504 sets switch time to be the current time so that decision block 529 will later operate correctly for the television show presented immediately after power on. Next, block 506 uses history structure 400 to find the show that the viewer is most interested in during the current time slot and assign it to Last Channel of Interest 450. This determination can be made in several ways. In this embodiment this would be determined by finding the record 420 in the current time slot that has the largest cumulative time 437 and assign its channel 433 to the Last Channel of Interest 450. Other examples of determining the initial program of interest to the user may include but are not limited to, finding the program that was last viewed during the time slot, or using a weighting value computed from both 435 and 437 such that the longer ago that the program was viewed the less weight the cumulative time 437 would provide.

Figure 6A:
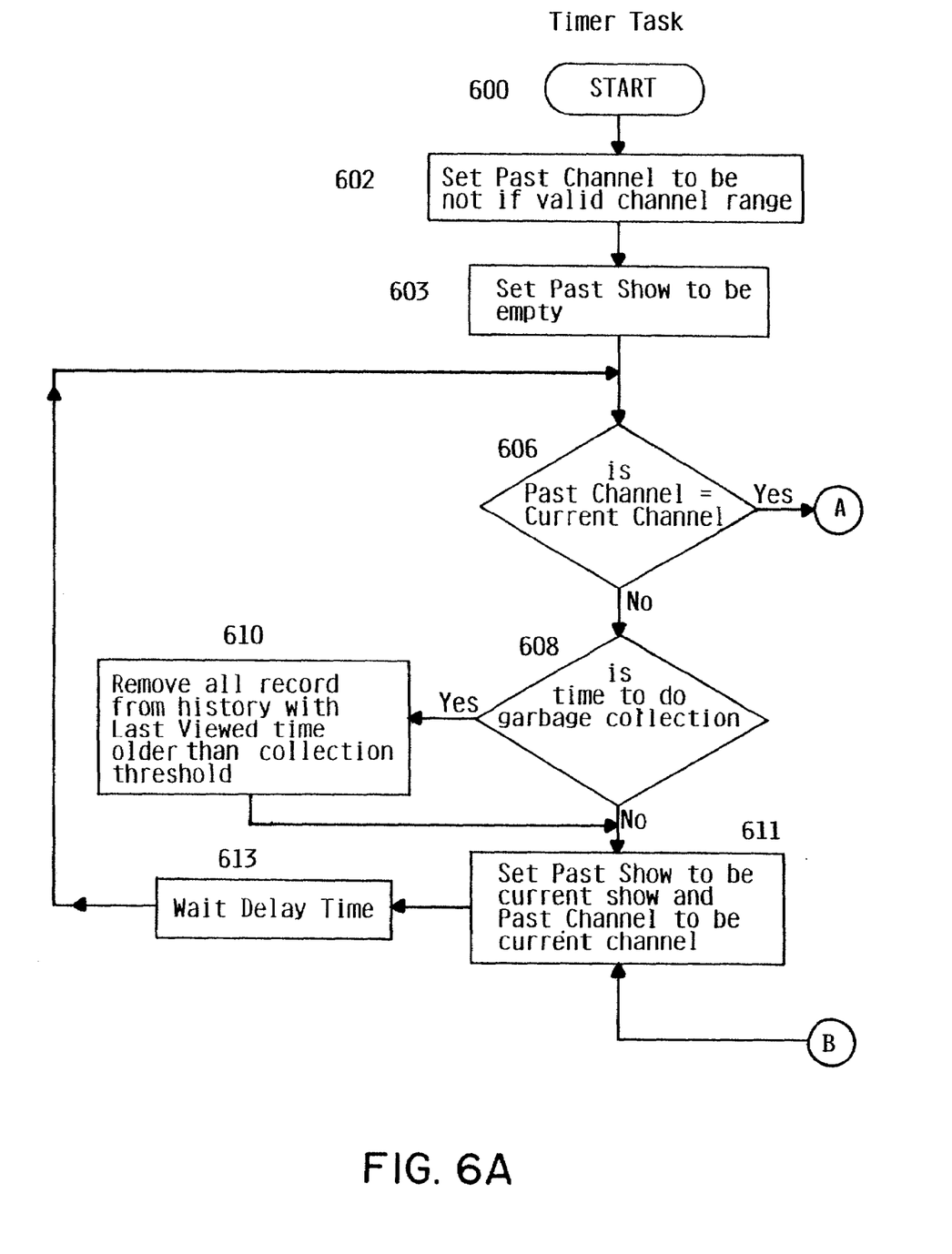
FIGS. 6A and 6B collectively illustrate a timer routine utilized to monitor and record the history of what has been watched and determine when a television show ends so the channel of interest can be updated.
Figure 6B:
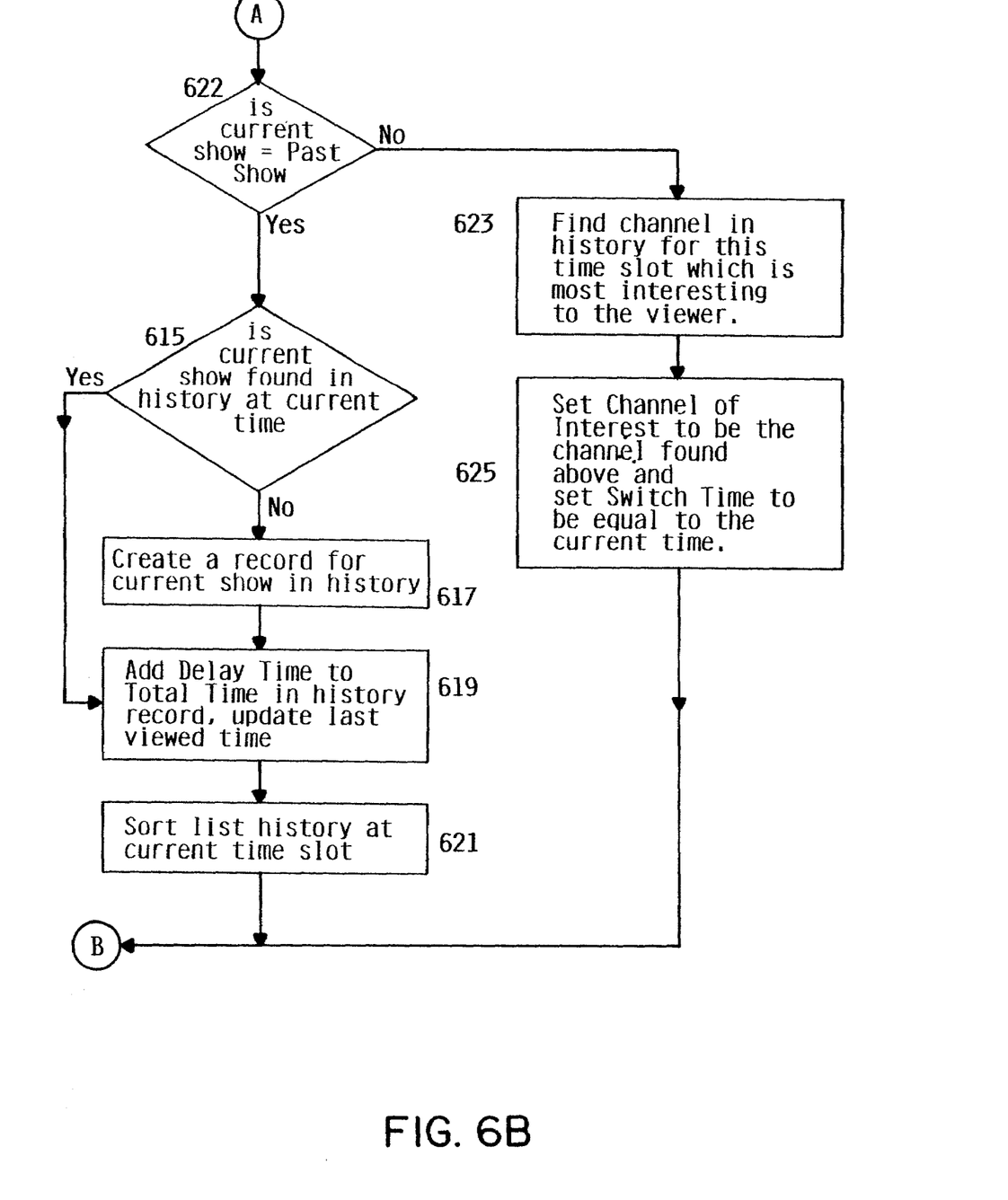

Continuing on, block 508 starts the Timer Task collectively illustrated in FIGS. 6a and 6b. This task is not called, but spawned as a process or thread that will now run in parallel to routine 500. Block 508 does not wait for Timer Task 600 to complete, so control continues to block 510. Block 510 receives events from User Input Interface 40. Pressing buttons on remote control 15 or controls on the front panel of set top box 14 generates these events. Next, block 512 tests to see if the event is an event that requires the current channel to be switched. Examples of such events include but are not limited to, pressing the channel up or down button on the remote, entering the channel number to directly navigate to the channel, or even pressing a special button to take to a particular channel such as a previous channel recall or even a memory button designated for a particular channel. If the event is such an event then control proceeds to decision block 522 where it is determined if the current show is a favorite show. This determination is done in a similar manner to that which step 506 utilizes. In this embodiment, the determination would be done by looking at History Structure 400 and determining if the show is the show with the highest cumulative view time 437 for the current time slot. Though as with block 506 those skilled in the art will appreciate that other ways of determining if the show is a favorite show can be utilized and fall within the scope of this invention. If the block 522 determines that the current show is a favorite show, the control is directed to block 525 where threshold is set to be a shorter than normal threshold. This threshold denotes the amount of time a viewer must view a show, without switching channels, for the channel broadcasting it to be assigned to the Last Channel of Interest 450. The result of making this time shorter is to make it easier for the current channel to be assigned to the Last Channel of Interest 450. If at 522 the current show was not found to be a favorite show, then control proceeds to block 524 where all the history records are examined to see if there is any record of the current show ever being viewed. If the current show has no history records, the control proceeds to block 526 where the threshold is assigned a longer threshold value. The result is that the viewer would have to view this show longer than normal for the channel broadcasting it to be assigned to the Last Channel of Interest 450. In the case that a record of the show being viewed is found at block 524 then control proceeds to block 528 where a normal value is assigned to threshold.

Once the value for threshold has been established in any of blocks 525, 526, or 528, control proceeds to block 529 where the threshold value is compared with the amount of time the viewer has been viewing the current show. This is done by taking the current time and subtracting the time that the user switched to the current channel. When a new show begins, routine 600 resets Switch Time 455 to be the time when the show starts to be broadcast. If the user has been watching the show long enough when they switch channels, then decision block 529 will be answered affirmatively and control will proceed to block 532 where Switch Time 455 will be set to the current time. Next, block 535 assigns the current channel to the Last Channel of Interest 450. If decision block 529 is answered negatively, control proceeds to block 531 where Switch Time 455 is assigned the current time, and then from either block 531 or 535, control proceeds to block 537 where the channel is switched to the selected or new channel. From block 537, control loops back to block 510 which waits for the next event to be generated.

When the user presses SV button 42 on remote 15, a signal is sent to User Input Interface 40 which generates a selective view button pressed event which is returned at block 510. Control then proceeds from 510 to 512, where it is determined whether a switch channel event has occurred. In this instance, the answer is negative, and control continues to block 514. Block 514 checks to see if the event is a selective view button pressed event. Since it is, control proceeds to block 516. This block retrieves the value from Last Channel of Interest 450 and saves it temporarily. Next, 518 assigns the current channel to Last Channel of Interest 450. Then block 520 changes channels so the current channel becomes the value temporarily saved in block 516, and control loops back to 510 to wait for the next event. If neither decision blocks 512 or 514 are answer affirmatively, then the event is for a function outside of the scope of this invention and as a result, control flows to block 538 where all such events are handled just as they are in existing set top boxes.

Referring now to FIGS. 6a and 6b, the purpose of the Timer Task routine 600 is to gather history information related to which television shows are watched most during a given time slot, maintain and cleanup old records in History Structure 400, determine when a new television show begins, and set Last Channel of Interest 450 and Switch Time 455 for a new television show and time slot. Routine 600 runs as its own process or thread in parallel or at the same time as routine 500. Routine 600 starts at block 602 where local variable Past Channel is set to a channel value such as "000" which will make it impossible for decision block 606 to be answered positively the first time through. Control then proceeds to block 603 where another local variable Past Show is cleared. Next control proceeds to decision block 606 which determines if the past channel and the current channel are still equal. If they are not equal, decision block 606 answers negatively and control proceeds to decision block 608.

Decision block 608 determines if it is time to do garbage collection. There are a number of heuristic schemes that can be used to determine when to perform garbage collection. In the illustrated embodiment this determination would be based on the amount of time that has passed since the last collection was run and the amount of memory available, such that if the amount of available memory were below some threshold, the garbage collector would be run, but other schemes could also be used such as counting the number of new records created and running the garbage collector after some number of new records 420 have been added to History Structure 400. Still another example would be to run the garbage collector once at the start of each month. Assuming 608 determines that it is time to run the garbage collector, control continues to block 610. Block 610 scans the History Structure 400 looking for records 420 with a last viewed date value 435 that is older than some threshold. A possible value for this threshold could be one month. If the television show represented by a particular record 400 has not been viewed for within the threshold period the record is removed from the history structure and its storage is reclaimed.

From block 610 or if decision block 608 is answered negatively control proceeds to block 611 where the local variables Past Channel and Past Show are set to the current channel and current show respectively. From 611 control proceeds to block 613 where the routine waits for some predetermined amount of time to pass before it resumes. Though the exact amount of time that block 613 delays processing is not critical to the invention, a reasonable amount of time would be 10 seconds. Once this time is up control proceeds from block 613 back to decision block 606.

Referring again to decision block 606, block 606 tests to see if the current channel being viewed and the value contained in the local variable Past Channel are the same. If the viewer had switched channels while routine 600 was waiting at block 613, they would not be the same, but for the purpose of explanation we will assume that the viewer has not changed channels since we last executed block 611 and as such decision block 606 will answer affirmatively. Control now proceeds to decision block 622 which checks if the current show has not changed. If Current Show equals Past Show, then the same show is still being aired and control proceeds to block 615 which checks History Structure 400 for a record 420 that exists in the linked list for the time slot 410 for the current time, which relates to the current show. If such a record is not found, decision block 615 answers negatively and control proceeds to block 617 which adds a record 420 for the current television show to the linked list that anchored in the time slot 410 which relates to the current time. From block 617 or if decision block 615 is answered affirmatively, control proceeds to block 619 which accesses the record 420 associated with the current time slot 410 and updates the cumulative time field 437 by adding the time that routine 600 waited at block 613 to the value in field 437, then stores this result back in field 437. Next, control passes to block 621 where the linked list associated with the current time slot 410 is sorted so that the record 420 with the largest cumulative time 437 is put first in the list. Next control proceeds to block 611 and from there to block 613 where routine 600 once again waits.

Referring again to decision block 622, if it is found that the current show is not the same as the show saved in the local variable Past Show and thus a new show is being broadcast, decision block 622 will answer negatively and control proceeds to block 623. Block 623 accesses History Structure 400, and checks the time slot 410 associated with the current time to find the channel that is associated with the record 420 for the television show that will be most interesting to the user. As discussed with block 506 there are several heuristics that could be used to determine which show will be the most interesting to the user. In the illustrative embodiment we would look for the record 420 with the largest cumulative time 437. In an alternate embodiment, the last view time field 435 can be expanded to include a time stamp as well as a date. This expanded last view time field 435 can then examined to identify the record of the show that was most recently watched at the current time slot. In yet another embodiment, an algorithm considers the values in 437 and 435 concurrently to determine which record 420 represents the show that is most likely to be of interest to the viewer. If it is determined that there are no shows in the current time slot 410 of interest, then the channel found is set to the current channel.

Next, block 625 assigns the channel found in 623 to The Last Channel of Interest 450. Next, block 625 sets Switch Time 455 to be the current time so the channel broadcasting the new show is not given extra credit towards being assigned to The Last Channel of Interest 450. Control now proceeds back to block 611 after which control proceeds to block 613 where routine 600 once again waits.

We claim:

1. A method for recalling a previous channel of programming information comprising the steps of:
   initializing a channel of interest;
   selecting a first channel of program information;
   monitoring an elapsed time spent on the first channel;
   storing historical channel access information in a channel history log;
   identifying and storing the first channel as the channel of interest if the elapsed time spent on the first channel exceeds a predetermined time threshold, further comprising the steps of:
   lengthening the predetermined time threshold if the first channel is broadcasting a seldom viewed program as determined by the channel history log, and shortening the predetermined time threshold if the first channel is broadcasting a frequently viewed program as determined by the channel history log;

switching to a plurality of additional channels, wherein the elapsed time spent on the additional channels does not exceed the predetermined time threshold;

activating a selective view function to return to the channel of interest from one of the plurality of additional channels; and resetting the channel of interest upon the completion of a program on the channel of interest then storing a program channel of historical interest as identified by the channel history log as the channel of interest.

2. A channel selection apparatus for recalling a previously accessed channel of interest, comprising:

a receiver capable of receiving a plurality of channels of broadcast material and a user generated channel selection signal, wherein the channel selection signal selects one of the plurality of channels of broadcast material, the receiver further comprising:

a memory; and a program resident in the memory, the program configured to measure the elapsed time spent on a selected channel; store a program guide for tracking start and stop times of programming material currently being broadcast on the plurality of channels; store a user history of program material accessed by a user over a predetermined time period; store the selected channel as a channel of interest if the selected channel exceeds a predetermined time threshold; lengthen the predetermined time threshold if the selected channel is a seldom viewed channel as determined from the user history; shorten the predetermined time threshold if the selected channel is a frequently viewed channel as determined from the user history; and switch to the channel of interest from the currently selected channel upon receipt of a channel recall signal from a selective view function.

* * * * *